United States Patent
Naganawa

(10) Patent No.: US 6,268,761 B1
(45) Date of Patent: Jul. 31, 2001

(54) BOOSTER CIRCUIT

(75) Inventor: Koji Naganawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/289,596

(22) Filed: Apr. 12, 1999

(30) Foreign Application Priority Data

Apr. 20, 1998 (JP) .................................................. 10-109200

(51) Int. Cl.[7] .................................................. G05F 1/10
(52) U.S. Cl. .................................................. 327/536
(58) Field of Search .................................... 327/390, 534, 327/535, 536

(56) References Cited

U.S. PATENT DOCUMENTS 4,736,121 * 4/1988 Cini et al. ..................... 307/296 R
5,767,729 * 6/1998 Song ................................ 327/390

FOREIGN PATENT DOCUMENTS

| 63290158 | 11/1988 | (JP) . |
| 6-60651 | 3/1994 | (JP) . |
| 660651 | 3/1994 | (JP) . |
| 799772 | 4/1995 | (JP) . |

* cited by examiner

Primary Examiner—Jeffrey Zweizig
(74) Attorney, Agent, or Firm—Young & Thompson

(57) ABSTRACT

Power source voltage is supplied to a boost driver of a booster circuit. The boost driver generates a pulse signal when a boost-starting signal indicative of start of boost is input. A boost capacitor boosts voltage level of an output terminal when the pulse signal is received. A precharge circuit supplies voltage to the output terminal on standby before boosting. A constant-voltage generating circuit supplies constant voltage to the precharge circuit.

9 Claims, 4 Drawing Sheets

BOOSTER CIRCUIT

BACKGROUND OF THE INVENTION

1. Field of the Invention

The present invention relates to a booster circuit used for reading data and such, and more particularly, to a booster circuit having function for controlling the boosting level within a desired range.

2. Description of the Related Art

Conventionally, a booster circuit is used for boosting of a word line when data stored in a semiconductor storage device is read. For example, a conventional booster circuit is described in Japanese Patent Application Laid-open No. 6-60651. FIG. 1 is a circuit diagram showing a conventional booster circuit described in Japanese Patent Application Laid-open No. 6-60651.

In the conventional booster circuit, a boost-starting signal ATDBST is input to an input terminal of an inverter 505, and a voltage Vboost is output from a boost node NDBST. An output terminal of the inverter 505 is connected to an input terminal of an inverter 506, a gate of an N-channel MOS transistor 503 and a gate of a P-channel MOS transistor 501. An output terminal of the inverter 506 is connected to one terminal of a boosting capacitor 507 whose capacity is Cb. The other terminal of the boosting capacitor 507 is connected to the boost node NDBST.

A drain of the N-channel MOS transistor 503 is grounded and a source thereof is connected to a drain of an N-channel MOS transistor 504. A source of the N-channel MOS transistor 504 is connected to a gate of a P-channel MOS transistor 502, and the junction point VX thereof is connected to one of input/output terminals of the P-channel MOS transistor 501.

Power source voltage VCC is always supplied to a gate of the N-channel MOS transistor 504, and the N-channel MOS transistor 504 is always in ON state. Further, one of input terminals of the P-channel MOS transistor 502 is connected to the power source voltage VCC, and the other input/output terminal is connected to the boost node NDBST. The other input/output terminal of the P-channel MOS transistor 501 is also connected to the boost node NDBST.

In the conventional booster circuit having the above-described structure, on standby before boosting, the boost-starting signal ATDBST is input to the inverter 505 at low level. The level of the boost-starting signal ATDBST is inverted by the inverter 505, and a signal of the level VCC is input to the input terminal of the inverter 506, the gate of the N-channel MOS transistor 503 and the gate of the P-channel MOS transistor 501.

With the above operation, the output signal of the inverter 506 is held at low level, and a low level signal is input to the boosting capacitor 507.

The N-channel MOS transistor 503 is brought into ON state, and the boost node NDBST and a gate level (node VX) of the P-channel MOS transistor 502 are held at low level. Therefore, the P-channel MOS transistor 502 assumes ON state. At that time, the P-channel MOS transistor 501 is kept in OFF state. As the P-channel MOS transistor 502 is turned ON, the power source voltage level VCC appears in the boost node NDBST as it is.

When the boost is started from that state, the boost-starting signal ATDBST is switched from low level to high level VCC and is input to the input terminal of the inverter 505.

With this operation, the output signal of the inverter 505 is inverted from high level VCC to low level, and the output signal of the inverter 506 is inverted from low level to high level VCC.

Therefore, a signal of high level VCC is applied to one terminal of the capacitor 507, a low level signal is input to the gate of the N-channel MOS transistor 503 and the gate of the P-channel MOS transistor 501. When the signal of high level VCC is applied to the one terminal of the capacitor 507, the boost node NDBST is boosted from the power source voltage level VCC to a voltage level shown in the equation (1) by capacitive coupling in the capacitor 507.

$$Vboost = (1 + (Cb/Cb + C1))) \times VCC \tag{1}$$

When the boost is completed, the input level of the boost-starting signal ATDBST is switched from high level to low level. Therefore, voltage level of each node is returned to level before boost is started. Then, the boost is completed.

When the above-described conventional booster circuit is used as booster means for a word line when data is read from a non-volatile semiconductor storage device, since it is necessary to secure both reading margin for on-cell and reading margin for off-cell, it is necessary to control the boost level within a range between the upper limit target and the lower limit target.

However, there is a problem that it is extremely difficult to give the highest priority to the achievement of the lower limit target, and to also achieve the upper limit target.

The reason is that there exist characteristics as dependence properties of power source voltage of boost level that the boost level is proportional to about two times of the power source voltage as shown in the equation (1).

Further, if the conventional booster circuit is used as boost means for a ward line when data is read from a non-volatile semiconductor storage device, when the voltage level of the word line is excessively increased, the gate level of memory cell is brought into boost level, the drain is brought into voltage level of about 1V, a pseudo weak writing mode is established. Therefore, reading is repeated and thus, there is a problem that variation is generated in a threshold value of the memory cell by the pseudo weak writing operation.

The reason is that there exist characteristics as dependence properties of power source voltage of boost level that the boost level is proportional to about two times of the power source voltage as described above.

SUMMARY OF THE INVENTION

It is an object of the present invention to provide a booster circuit capable of stably controlling boosting electric potential without depending on the power source voltage with respect to the target boost upper limit even when electric potential greater than the power source voltage is boosted.

According to one aspect of the present invention, a booster circuit includes an output terminal and a boost driver to which power source voltage is supplied. The boost driver generates a pulse signal when a boost-starting signal indicative of start of boost is input. The booster circuit further includes a boost capacitor which boosts voltage level of said output terminal when the pulse signal is received, a precharge circuit which supplies voltage to the output terminal on standby before boosting, and a constant-voltage generating circuit which supplies constant voltage to the precharge circuit.

According to another aspect of the present invention, a booster circuit includes an output terminal and a boost driver which generates a pulse signal when a boost-starting signal indicative of start of boost is input. The booster circuit further includes a boost capacitor which boosts voltage level of said output terminal when the pulse signal is received, a precharge circuit to which power source voltage is supplied, and a constant-voltage generating circuit which supplies constant voltage to the boost driver. The precharge circuit supplies voltage to the output terminal on standby before boosting.

According to a possible feature of the present invention, a booster circuit includes an output terminal and a boost driver which generates a pulse signal when a boost-starting signal indicative of start of boost is input. The booster circuit further includes a boost capacitor which boosts voltage level of the output terminal when the pulse signal is received, a precharge circuit which supplies voltage to the output terminal on standby before boosting, and a constant-voltage generating circuit which supplies constant voltage to the boost driver and the precharge circuit.

According to the present invention, at least one of the precharge level on standby before boosting and the amplitude level of the boost pulse may be controlled by the constant voltage generated from the constant-voltage generating circuit. Therefore, since at least one of them may be a level which does not rely on the power source voltage, it is possible to easily achieve the upper limit target even if the priority is given to the lower limit target of the boost level.

As a result, if the present invention is adapted to boost a voltage level of a word line when data is read from a non-volatile semiconductor storage device, it is possible to prevent the reading error due to boost of the voltage level of the word line. Similarly, it is possible to prevent the pseudo weak writing state due to the boost of the voltage level of the word line.

BRIEF DESCRIPTION OF THE DRAWINGS

FIG. 6 is a circuit diagram showing the structure of a precharge circuit 105a; and FIG. 7 is a circuit diagram showing the structure of a boost driver 102a.

DETAILED DESCRIPTION OF THE PREFERRED EMBODIMENTS

Figure 1:
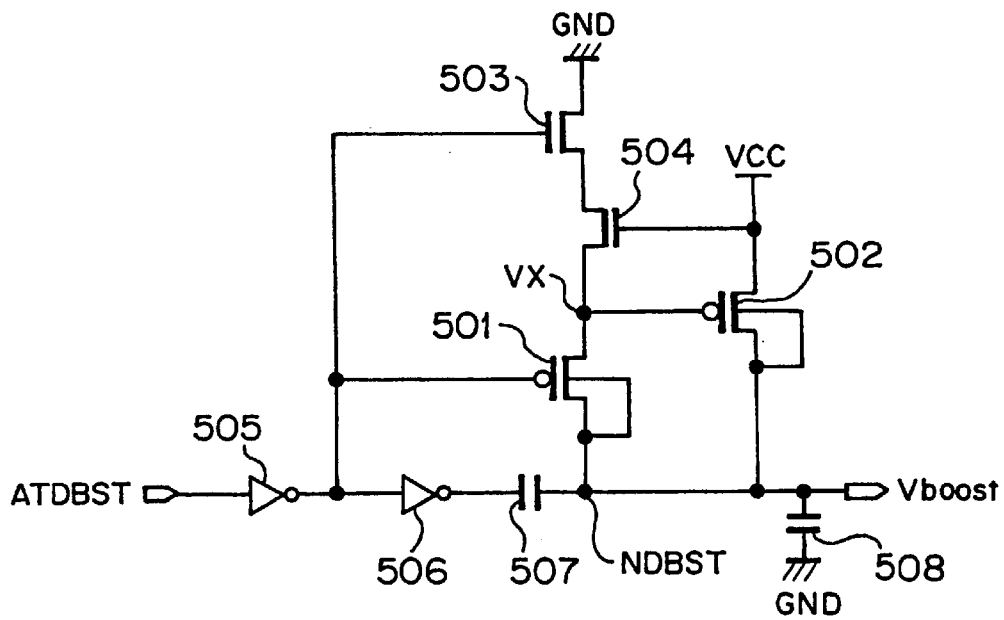
FIG. 1 is a circuit diagram showing a conventional booster circuit described in Japanese Patent Application Laid-open No. 6-60651.
Figure 2:
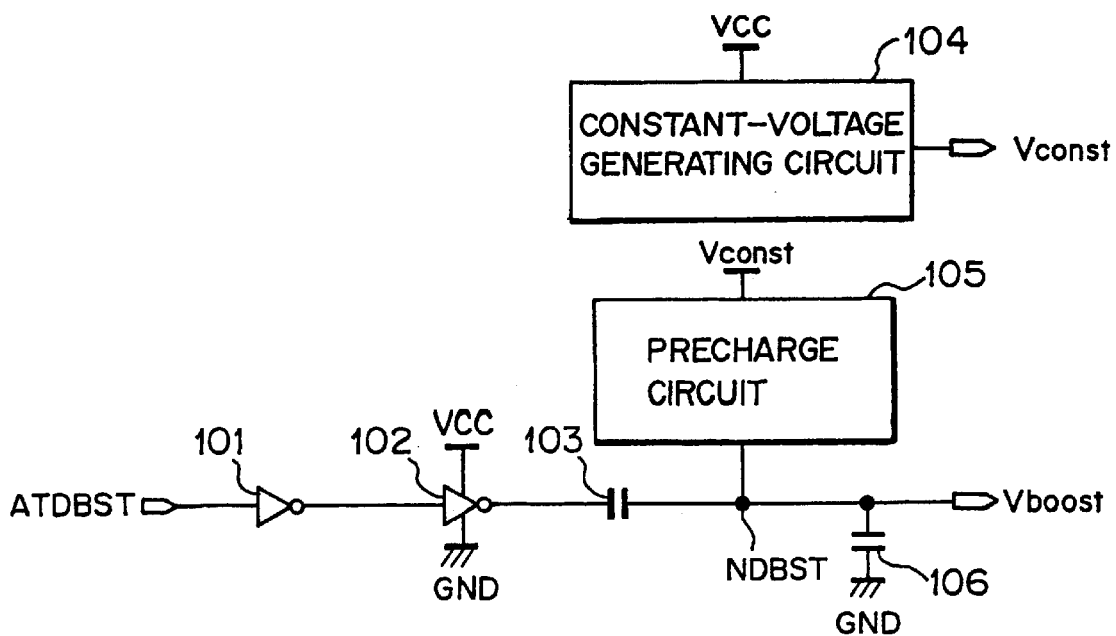
FIG. 2 is a block diagram showing a booster circuit of a first embodiment of the present invention.

Booster circuits of embodiments of the present invention will be explained concretely with reference to the accompanying drawings below. FIG. 2 is a block diagram showing a booster circuit of a first embodiment of the present invention.

In the booster circuit of the first embodiment, a boost-starting signal ATDBST is input to an input terminal of an inverter 101, and a voltage Vboost is output from a boost node NDBST (high voltage output terminal). An input terminal of a boost driver 102 is connected to an output terminal of the inverter 101. One terminal of a boost capacitor 103 is connected to an output terminal of the boost driver 102. A boost pulse is generated from the boost driver 102 to the boost capacitor 103. The boost node NDBST is connected to the other terminal of the boost capacitor 103.

The boost node NDBST is connected to a high voltage output terminal (Vboost), and the high voltage output terminal is boosted by the boost capacitor 103 which received the boost pulse. The capacity value of the boost capacitor 103 is Cb.

There is preferably provided a precharge circuit 105 connected to the high voltage output terminal for supplying voltage to the high voltage output terminal (Vboost) on standby before boosting. A constant voltage Vconst is input to the precharge circuit 105 as power source. An output terminal of the precharge circuit 105 is connected to the boost node NDBST.

Further, a boost load capacitor 106 may be connected to the boost node NDBST. The capacity value of the boost load capacitor 106 is C1.

The booster circuit is preferably provided with a constant-voltage generating circuit 104 for supplying the constant voltage to the precharge circuit 105. The power source voltage VCC is supplied to the constant-voltage generating circuit 104, and the constant voltage Vconst is output from an output terminal of the constant-voltage generating circuit 104.

Figure 3:
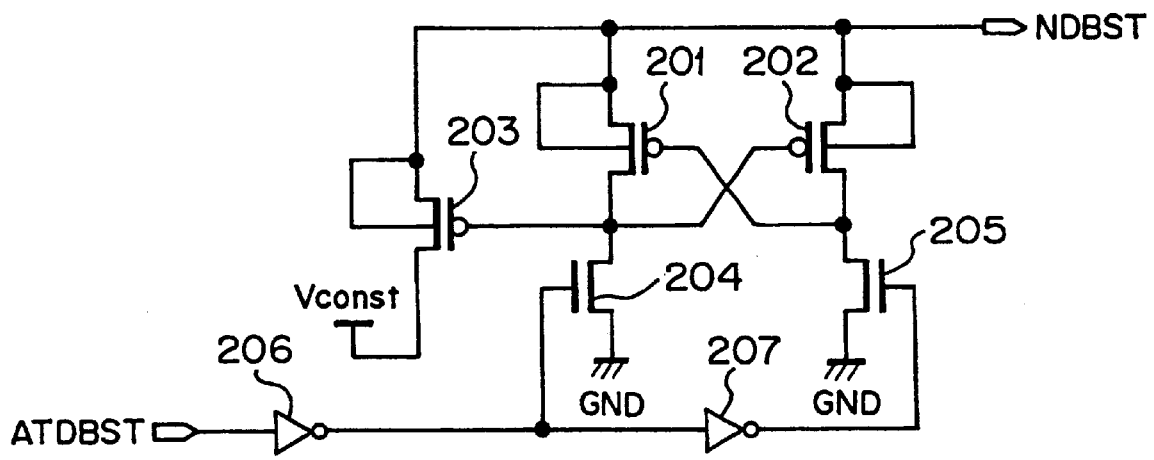
FIG. 3 is a circuit diagram showing the structure of a precharge circuit 105.

Next, the precharge circuit 105 used for the booster circuit of the first embodiment will be explained. FIG. 3 is a circuit diagram showing the structure of the precharge circuit 105.

The precharge circuit 105 can be provided with an inverter 206 having an input terminal to which the boost-starting signal ATDBST is input. An input terminal of an inverter 207 and a gate terminal of an N-channel MOS transistor 204 are connected to an output terminal of the inverter 206. A gate terminal of an N-channel MOS transistor 205 is connected to an output terminal of the inverter 207.

A source terminal of the N-channel MOS transistor 204 is grounded. A drain terminal of a P-channel MOS transistor 201, a gate terminal of a P-channel MOS transistor 202 and a gate terminal of a P-channel MOS transistor 203 are connected to a drain terminal of the N-channel MOS transistor 204.

A source terminal of the N-channel MOS transistor 205 is connected to a ground potential. A drain terminal of the P-channel MOS transistor 202 and a gate terminal of the P-channel MOS transistor 201 are connected to a drain terminal of the N-channel MOS transistor 205.

A source terminal of the P-channel MOS transistor 203 is connected to the constant voltage Vconst, and a drain terminal of the P-channel MOS transistor 203 is connected to the boost node NDBST.

The boost node NDBST is connected to the source terminals of the P-channel MOS transistors 201 and 202.

Figure 4:
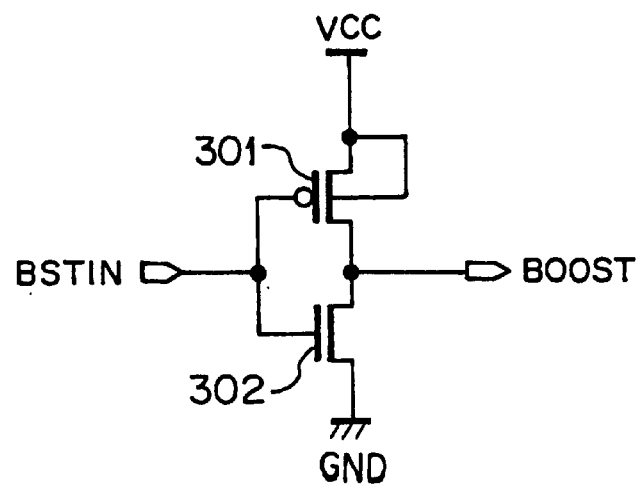
FIG. 4 is a circuit diagram showing the structure of a boost driver 102.

Next, the boost driver 102 used for the booster circuit of the first embodiment will be explained. FIG. 4 is a circuit diagram showing the structure of the boost driver 102.

The boost driver 102 can be provided with a P-channel MOS transistor 301 having a gate terminal to which an inverted signal BSTIN of the boost-starting signal is input. A source terminal of the P-channel MOS transistor 301 is connected to the power source voltage VCC, and a drain terminal of the P-channel MOS transistor 301 is connected to a boost pulse generating node BOOST.

The boost driver 102 may be also provided with an N-channel MOS transistor 302 having a gate terminal to which an inverted signal BSTIN of the boost-starting signal is input. A source terminal of the N-channel MOS transistor 302 is connected to a ground potential, and a drain terminal of the N-channel MOS transistor 302 is connected to the boost pulse generating node BOOST.

The operation of the booster circuit of the first embodiment structured as described above will be explained next.

On standby before boosting, the boost-starting signal ATDBST is input to the inverter 101 at low level. The level of the boost-starting signal ATDBST is inverted by the inverter 101 and a signal of high level VCC is input to the input terminal of the boost driver 102.

Thus, the output signal of the boost driver 102 is kept at low level, and the low level signal is input to one of the terminals of the boost capacitor 103. At that time, the voltage Vconst supplied from the constant-voltage generating circuit 104 appears in the boost node NDBST as it is through the precharge circuit 105, and electric charge is stored in the boost capacitor 103 and the boost load capacitor 106.

When the boost is started from that state, the boost-starting signal ATDBST is switched from low level to high level VCC and is input to the input terminal of the inverter 101.

Thus, the output signal of the inverter 101 is inverted from high level VCC to low level, and the output signal of the boost driver 102 is inverted from low level to high level VCC.

Therefore, a signal of high level VCC is applied to one terminal of the boost capacitor 103. When high level VCC signal is applied to one terminal of the boost capacitor 103, the boost node NDBST is boosted from the precharge level Vconst to a voltage level shown in the equation (2) by capacitive coupling in the boost capacitor 103.

$$\text{Vboost}=\text{Vconst}+(Cb/(Cb+C1))\times \text{VCC} \qquad (2)$$

In the equation (2), Vboost is voltage which is output from the high voltage output terminal, Vconst is constant voltage which is output from the constant-voltage generating circuit 104, Cb is a capacity value of the boost capacitor 103, C1 is a capacity value of the boost load capacitor 106, and VCC is power source voltage supplied to the constant-voltage generating circuit 104.

When the boost is completed, the input level of the boost-starting signal ATDBST is switched from high level to low level. Therefore, voltage level of each node is returned to level before boost is started. Then, the boost is completed.

As described above, according to the first embodiment, since the precharge level on standby before boosting is constant voltage which does not rely on the power source voltage, it is easy to control the boost level to the upper limit.

Figure 5:
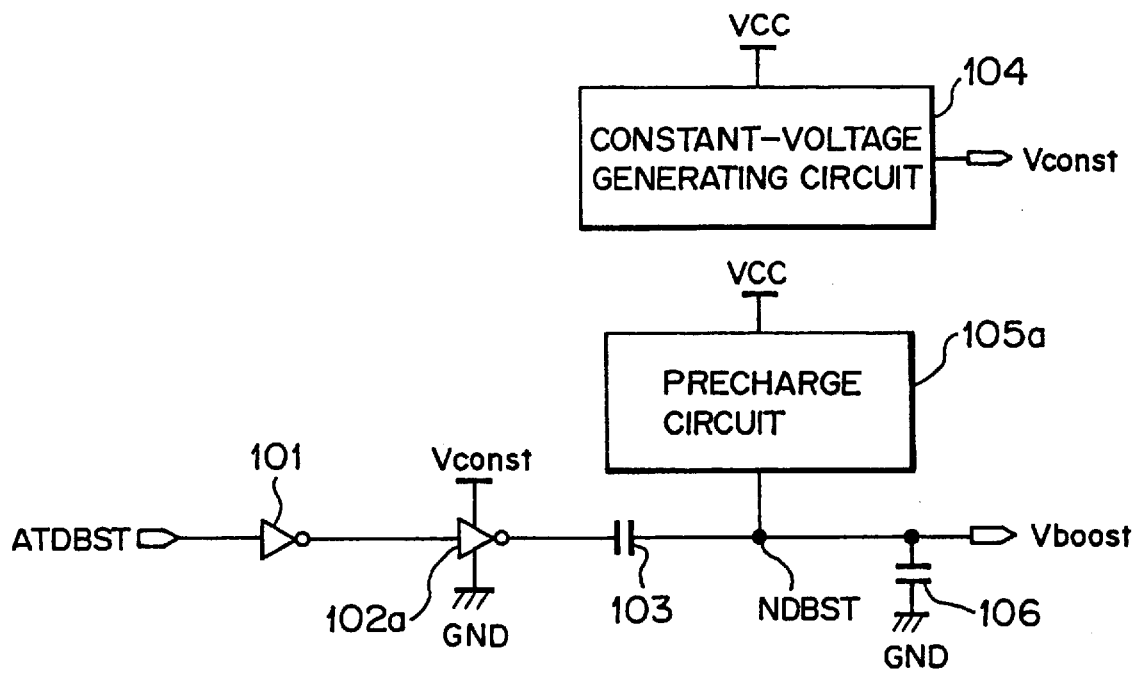
FIG. 5 is a block diagram showing a booster circuit of a second embodiment of the present invention.

Next, a second embodiment of the present invention will be explained. FIG. 5 is a block diagram showing a booster circuit of the second embodiment of the invention.

In the booster circuit of the second embodiment, a boost-starting signal ATDBST is input to an input terminal of an inverter 101, and a voltage Vboost is output from a boost node NDBST (high voltage output terminal). An input terminal of a boost driver 102a is preferably connected to an output terminal of the inverter 101. One terminal of a boost capacitor 103 is connected to an output terminal of the boost driver 102a. A boost pulse is generated from the boost driver 102a to the boost capacitor 103. The boost node NDBST is connected to the other terminal of the boost capacitor 103. The boost node NDBST is connected to a high voltage output terminal (Vboost), and the high voltage output terminal is boosted by the boost capacitor 103 which received the boost pulse. The capacity value of the boost capacitor 103 is Cb.

There may be provided a precharge circuit 105a connected to the high voltage output terminal for supplying voltage to the high voltage output terminal (Vboost) on standby before boosting. A power source voltage VCC is input to the precharge circuit 105a as power source. An output terminal of the precharge circuit 105a is connected to the boost node NDBST.

Further, a boost load capacitor 106 is connected to the boost node NDBST. The capacity value of the boost load capacitor 106 is C1.

The booster circuit is preferably provided with a constant-voltage generating circuit 104 for supplying the constant voltage Vconst to the boost driver 102a. The power source voltage VCC is supplied to the constant-voltage generating circuit 104, and the constant voltage Vconst is output from an output terminal of the constant-voltage generating circuit 104.

Figure 6:
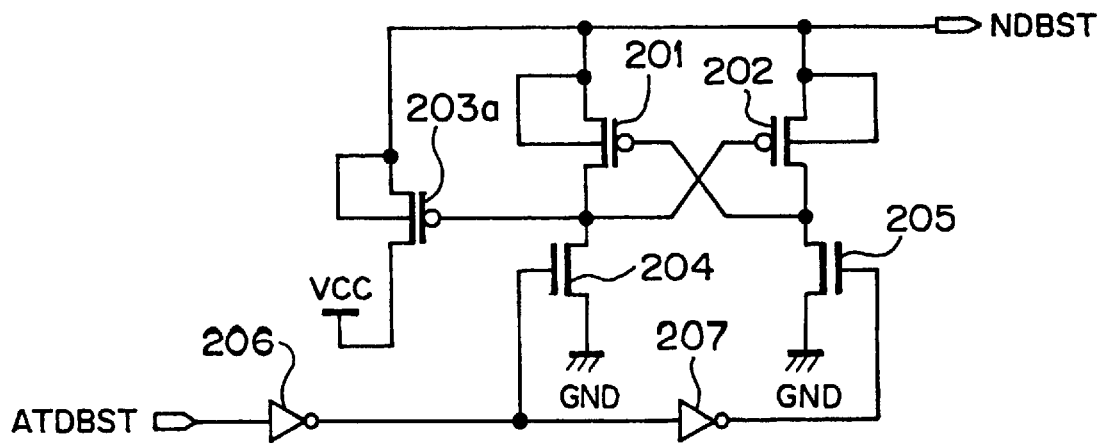
Figure 7:
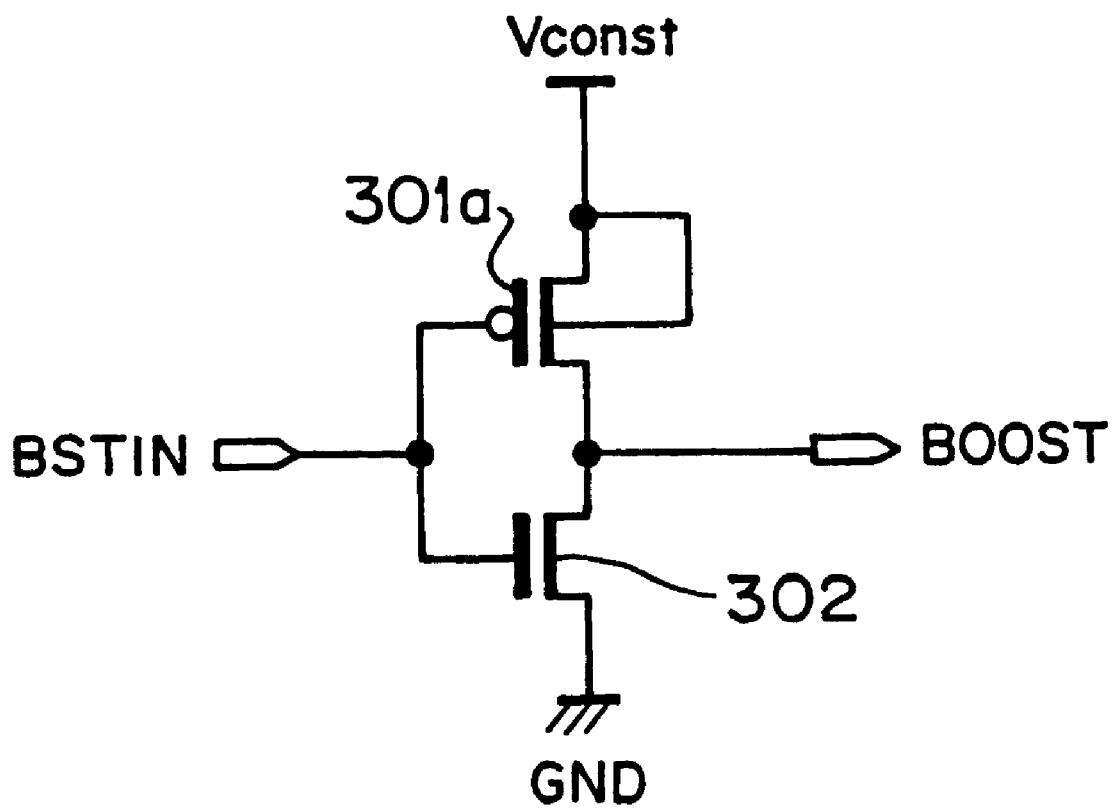

Next, the precharge circuit 105a and the boost driver 102a used for the booster circuit of the second embodiment will be explained. FIG. 6 is a circuit diagram showing the structure of the precharge circuit 105a and FIG. 7 is a circuit diagram showing the structure of the boost driver 102a. In the precharge circuit 105a shown in FIG. 6 or the boost driver 102a shown in FIG. 7, elements similar to those of the precharge circuit 105 or the boost driver 102 shown in FIG. 3 or 4 are designated by the same reference numerals, and their detailed description will be omitted.

As shown in FIG. 6, the precharge circuit 105a used in the second embodiment is preferably provided with a P-channel MOS transistor 203a having a source terminal connected to the power source voltage VCC, instead of the transistor 203 having the source terminal connected to the constant voltage Vconst.

Further, as shown in FIG. 7, the booster circuit 102a used in the second embodiment is preferably provided with a P-channel MOS transistor 301a having a source terminal connected to the constant voltage Vconst, instead of the transistor 301 having the source terminal connected to the power source voltage VCC.

The operation of the booster circuit of the second embodiment structured as described above will be explained.

On standby before boosting, the boost-starting signal ATDBST is input to the inverter 101 at low level. The level of the boost-starting signal ATDBST is inverted by the inverter 101 and a signal of high level VCC is input to the input terminal of the boost driver 102a.

Thus, the output signal of the boost driver 102a is kept at low level, and the low level signal is input to one of the terminals of the boost capacitor 103. At that time, the power source voltage VCC appears in the boost node NDBST as it is through the precharge circuit 105a, and electric charge is stored in the boost capacitor 103 and the boost load capacitor 106.

When the boost is started from that state, the boost-starting starting signal ATDBST is switched from low level to high level VCC and is input to the input terminal of the inverter 101.

Thus, the output signal of the inverter 101 is inverted from high level VCC to low level, and the output signal of the boost driver 102a is inverted from low level to high level Vconst.

Therefore, a signal of high level Vconst is applied to one terminal of the boost capacitor 103. When a high level signal Vconst is applied to one terminal of the boost capacitor 103, the boost node NDBST is boosted from the precharge level VCC to a voltage level shown in the equation (3) by capacitive coupling in the boost capacitor 103.

$$\text{Vboost}=\text{VCC}+(Cb/(Cb+C1))\times \text{Vconst} \qquad (3)$$

In the equation (3), Vboost is voltage which is output from the high voltage output terminal, Vconst is constant voltage which is output from the constant-voltage generating circuit 104, Cb is a capacity value of the boost capacitor 103, C1 is a capacity value of the boost load capacitor 106, and VCC is power source voltage supplied to the constant-voltage generating circuit 104.

When the boost is completed, the input of the boost-starting signal ATDBST is switched from high level to low level. Therefore, voltage level of each node is returned to level before boost is started. Then, the boost is completed.

As described above, according to the second embodiment, since amplitude level of the boost pulse is constant voltage which does not rely on the power source voltage, it is easy to control the boost level to the upper limit.

Although the constant voltage is supplied from the constant-voltage generating circuit 104 to the precharge circuit 105 in the first embodiment, and the constant voltage is supplied from the constant-voltage generating circuit 104 to the booster circuit 102*a* in the second embodiment, the present invention should not be limited to such structures.

For example, the constant voltage may be supplied to both the precharge circuit and the boost driver from the constant-voltage generating circuit. In this case, the precharge circuit is preferably structured as shown in FIG. 3, and the constant voltage is supplied from the precharge circuit to the high voltage output terminal (Vboost) on standby before boosting. The boost driver is preferably structured as shown in FIG. 7, and the boost pulse is generated from the boost driver to the boost capacitor. The high voltage output terminal is boosted by the boost capacitor which received the boost pulse. In this case, each of the precharge level on standby before boosting and the amplitude level of the boost pulse is constant voltage which does not rely on the power source voltage.

What is claimed is:

1. A booster circuit, comprising:
   an output terminal;
   a boost driver to which power source voltage VCC is supplied, said boost driver generating a pulse signal when a boost-starting signal indicative of start of boost is input;
   a boost capacitor which boosts voltage level of said output terminal when said pulse signal is received;
   a precharge circuit which supplies voltage to said output terminal on standby before boosting; and
   a constant-voltage generating circuit having as an input the power source voltage VCC, said constant-voltage generating circuit supplying a regulated constant voltage to said precharge circuit.

2. A booster circuit according to claim 1, wherein said precharge circuit comprises:
   a switching field-effect transistor whose source is connected to said constant-voltage generating circuit and whose drain is connected to said output terminal; and
   a control circuit which controls electric potential of a gate of said switching field-effect transistor in association with said boost-starting signal.

3. The booster circuit of claim 2, wherein the control circuit of the precharge circuit comprises:
   a first pulldown FET connected between ground and the gate of the switching field-effect transistor;
   a first pullup FET connected between the output terminal and the gate of the switching field-effect transistor;
   a second pulldown FET connected between ground and a gate of the first pullup FET;
   a second pullup FET connected between the output terminal and the gate of the first pullup FET;
   wherein the first pulldown FET is connected so as to conduct when the boost-starting signal is at a first voltage level, and the second pulldown FET is connected so as to conduct when the boost-starting signal is at a second voltage level.

4. The booster circuit of claim 3, wherein the switching field-effect transistor, the first pullup FET, and the second pullup FET are all P-channel devices.

5. The booster circuit of claim 4, wherein the first and second pulldown FETs are N-channel devices.

6. The booster circuit of claim 5, wherein a gate of the first pulldown FET is connected to an output of a first inverter, an input of which is connected to the boost-starting signal.

7. The booster circuit of claim 6, wherein a gate of the second pulldown FET is connected to an output of a second inverter, an input of which is connected to the gate of the first pulldown FET.

8. A booster circuit according to claim 1, wherein said boost driver comprises:
   a first field-effect transistor whose gate inputs an inverted signal of said boost-starting signal, said power source voltage being supplied to a source of said first field-effect transistor; and
   a second field-effect transistor whose source is grounded and whose drain is connected to a drain of said first field-effect transistor, a gate of said second field-effect transistor inputting an inverted signal of said boost-starting signal, and a conductive type of a channel of said second field-effect transistor being different from that of said first field-effect transistor.

9. The booster circuit of claim 1, wherein the regulated constant voltage has a value different from the value of VCC.

\* \* \* \* \*